3,702,783
EPOXY SILANE COUPLING AGENTS
Robert C. Hartlein, % Dow Corning Corporation,
Midland, Mich. 48640
No Drawing. Filed Sept. 4, 1970, Ser. No. 69,979
Int. Cl. C03c 25/02
U.S. Cl. 117—126 GS                          4 Claims

ABSTRACT OF THE DISCLOSURE

The bonding of siliceous surfaces, such as glass, to organic resins, such as polyamides, is improved by coating the siliceous surface with a mixture of 3-glycidoxypropyltrimethoxysilane and methyltrimethoxysilane.

---

This invention relates to an improved coupling agent. In one aspect the invention relates to improving the bonding of epoxy resins to glass fibers.

Epoxy-functional silanes are well-known as coupling agent for improving the bond strength of various organic resins to solid siliceous surfaces. One particularly useful silane is 3-glycidoxypropyltrimethoxysilane which is employed in glass-resin systems in which the resins include epoxy, polyamides, acrylates, phenolics, melamine and polysulfides.

By the practice of the present invention, wherein a methyl-functional silane is blended with an epoxy-functional silane, there is provided an improved silane coupling agent.

Thus, it is an object of the invention to provide a highly effective, economical silane coupling agent.

Another object of the present invention is to provide improved bonding between siliceous surfaces and organic resins.

These and other objects of the invention will be apparent to one skilled in the art upon consideration of the following disclosure and claims.

According to the invention, there is provided an article comprising a solid siliceous material having coated on the surface thereof a mixture consisting essentially of (a) 30 to 70 weight percent of a silane of the formula

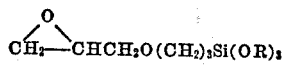

in which R is a lower alkyl radical of from 1 to 3 inclusive carbon atoms; and (b) 30 to 70 weight percent of a silane of the formula $CH_3Si(OR)_3$ in which R is as previously defined.

The epoxy-functional silanes (a) include

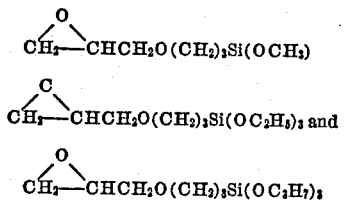

Mixtures of the 3-glycidoxypropyl-functional silanes can be used in the practice of the invention. The methylsilanes (b) include methyltrimethoxysilanes, methyltriethoxysilane, methyltripropoxysilanes and mixtures thereof.

The siliceous substrate to which the mixture of silanes is applied can be glass fibers, asbestos, crushed quartz, mica, sand, glass panels and the like. The term "glass fibers" includes glass rovings, yarns, milled fibers, strands, bundles or fabrics which are especially useful in forming reinforced plastic composites.

The silane mixtures can be applied to the siliceous material in any convenient manner, for example, by dipping or spraying. When glass fibers are to be treated, it is advantageous to apply the silane mixture at the extrusion bushing as the fibers are produced. The silanes can be applied from an aqueous sizing solution which contains other components, for example, film-forming binders, such as polyvinylacetate. The other components of the sizing should not be reactive with the silanes.

If applied from an aqueous solution, the silanes should be present in an amount sufficient to provide from 0.01 to 5 weight percent of the silane mixture in the solution. This concentration provides an effective silane loading of greater than 0.01 weight percent on the siliceous substrate. Preferably, the silane loading on the surface of the siliceous substrate is in the range of 0.1 to 2.0 weight percent, based on the weight of the siliceous material. After application of the silane mixture, the treated siliceous material can be allowed to air dry or drying can be accelerated by heating.

Epoxysilanes are known as coupling agents, but in view of the lack of reactive functionality in the methyltrialkoxysilane component of the mixture, it is unexpected that the silane mixture provides higher strength glass-resin laminate than those obtained from glass treated with solutions containing comparable concentrations of the 3-glycidoxypropyltrialkoxysilanes. This improved strength is noted in resin laminates utilizing epoxy resins. Thus, when the treated glass is utilized with these resins, one realizes a dual advantage; the silane mixture costing much less than the commercially available silanes, yet giving greater strength than does the reactive silane alone.

Accordingly, the invention provides an improvement in methods of sizing glass fibers to strengthen the bond obtained with epoxy resins, the improvement comprising coating glass fibers with a size composition containing from 0.01 to 5 percent by weight of the defined mixture of 3-glycidoxypropyltrialkoxysilanes and methyltrialkoxysilanes.

Suitable epoxy resins for practice of this aspect of the invention include the halogen-free condensation products of an epihalogen- or dihalogenhydrin and a polyhydric alcohol, preferably a polyhydric phenol. The polyhydric phenol may be a condensation product of a ketone or aldehyde with a phenol. Low molecular weight epoxy resins derived from bisphenol A and epichlorohydrin are especially suitable in the fabrication of glass-resin laminates. Examples of amine-curing agents or hardeners for these epoxy resins include guanidine, diphenylguanidine, piperidine, triethanolamine, piperazine, hexamethylenetetramine and alkylene polyamides, such as triethylenetetramine, tetraethylenepentamine and pentaethylenehexamine.

Amino resins can also be used in the practice of the invention. These materials are well known and are reaction products of melamine and formaldehyde or urea and formaldehyde. Polyamides and polyacrylates are also reactive with the epoxy-functional silane.

A preferred embodiment of the invention consists of glass fibers or other siliceous materials having a coating of a silane mixture consisting essentially of about 35 to 45 weight percent of 3-glycidoxypropyltrimethoxysilane and 55 to 65 weight percent methyltrimethoxysilane. Glass fibers treated with this particular mixture give exceptionally high strength when fabricated with epoxy resin to form composite articles.

The following example is illustrative of the invention which is delineated in the appended claims.

EXAMPLE

Various mixtures of 3-glycidoxypropyltrimethoxysilane and methyltrimethoxysilane were added to sufficient water to form 0.125 weight percent and 0.5 weight percent solutions of the silanes. For purposes of comparison, solutions containing 0.125 and 0.5 weight percent of 3-glycidoxypropyltrimethoxysilane were also prepared. Samples of heat-cleaned E-glass in the form of woven fabric were immersed in the silane solutions. The glass cloth was dried for 30 minutes at room temperature and then heated for 7 minutes at 230° F. The samples of silane-treated glass fabrics were laminated with an aromatic amine-cured epoxy resin. The treated glass cloth was impregnated with the epoxy resin and stacked in the form of a 14-ply laminate. The epoxy resin was the condensation product of two moles of epichlorohydrin and one mol of bis(parahydroxylphenyl)dimethylmethane. This polymer had an epoxide equivalent weight of from 187 to 193. The catalyst utilized was metaphenylene diamine, which was added in the amount of 13 weight percent based on the weight of epoy resin.

The epoxy resin laminates were cured in a press for 30 minutes at 150° C. The flexural strength of the cured laminate (dry flex) was determined. Other laminates were immersed in boiling water for two hours, removed and immediately immersed in cold water. The laminates were removed from the cold water, wiped dry and tested to determine the percent retention of strength as compared to dry flex strength. The silane treating compositions and strength values are tabulated below:

| Treatment, silanes on glass | | Laminate properties | |
|---|---|---|---|
| Weight percent, 3-glycidoxypropyl-trimethoxysilane | Weight percent, methyl-trimeth-oxysilane | Dry flex strength (p.s.i.) | Wet flex strength (p.s.i.) |
| From 0.125% aqueous solution of: | | | |
| 100 | 0 | 72,600 | 67,500 |
| 50 | 50 | 81,400 | 79,800 |
| 33 | 67 | 76,100 | 71,200 |
| From 0.5 weight percent aqueous solution: | | | |
| 100 | 0 | 70,600 | 67,600 |
| 67 | 33 | 72,400 | 73,400 |
| 50 | 50 | 75,700 | 75,200 |
| 33 | 67 | 74,900 | 70,300 |

The data set forth in the above table demonstrates that laminates treated in accordance with the invention exhibit superior physical properties to those prepared from glass treated with only the reactive component of the described silane mixture.

Reasonable modification and variation are within the scope of the invention which to improved silane coupling agents for coating siliceous surfaces.

That which is claimed is:

1. An improved method of sizing glass fibers, the improvement comprising coating said glass fibers with an aqueous size composition containing from 0.01 to 5 weight percent of a mixture of silanes consisting essentially of
  (a) 30 to 70 percent of silanes of the formula

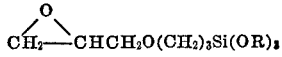

in which R is an alkyl radical of from 1 to 3 inclusive carbon atoms;
  (b) 30 to 70 weight percent of silanes of the formula $CH_3Si(OR)_3$ in which R is as defined above.

2. The method of claim 1 wherein the silane (a) is

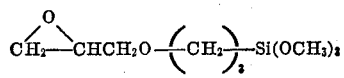

3. The method of claim 2 wherein the silane (b) is $$CH_3Si(OCH_3)_3$$

4. The method of claim 3 wherein the silane (a) is present in an amount in the range of 35 to 45 weight percent of the mixture and silane (b) is present in an amount in the range of 55 to 65 weight percent of the mixture.

References Cited
UNITED STATES PATENTS 3,455,877  7/1969  Plueddemann ____ 260—824 EP
2,946,701  7/1960  Plueddemann ____ 117—126 GS WILLIAM D. MARTIN, Primary Examiner D. COHEN, Assistant Examiner U.S. Cl. X.R.

117—123 C, 124 F, 126 GE; 260—348 SC, 448.2 B